(12) United States Patent
Pankey

(10) Patent No.: US 12,320,443 B1
(45) Date of Patent: Jun. 3, 2025

(54) ADJUSTABLE HANDLE DEVICE FOR USE WITH A VALVE STEM

(71) Applicant: Donzino Pankey, Charlotte, NC (US)

(72) Inventor: Donzino Pankey, Charlotte, NC (US)

( * ) Notice: Subject to any disclaimer, the term of this patent is extended or adjusted under 35 U.S.C. 154(b) by 92 days.

(21) Appl. No.: 18/231,307

(22) Filed: Aug. 8, 2023

Related U.S. Application Data

(60) Provisional application No. 63/398,263, filed on Aug. 16, 2022.

(51) Int. Cl.
*F16K 31/60* (2006.01)
*F16K 35/02* (2006.01)
*E03C 1/04* (2006.01)

(52) U.S. Cl.
CPC ............ *F16K 31/60* (2013.01); *F16K 31/602* (2013.01); *F16K 35/025* (2013.01); *E03C 1/0412* (2013.01); *F16K 31/605* (2013.01); *Y10T 137/6024* (2015.04); *Y10T 279/17632* (2015.01)

(58) Field of Classification Search
None
See application file for complete search history.

(56) References Cited

U.S. PATENT DOCUMENTS

| | | | | |
|---|---|---|---|---|
| 2,004,860 A * | 6/1935 | Ferrari | ..................... | F16K 27/02 251/291 |
| 2,463,066 A * | 3/1949 | Stuvel | ..................... | F16K 31/60 403/362 |
| 2,587,862 A * | 3/1952 | Krucki | ..................... | F16K 31/60 403/253 |
| 3,243,210 A * | 3/1966 | Manning | .................. | F16K 31/60 403/369 |
| 4,928,919 A * | 5/1990 | Daicho | .................... | F16K 1/305 251/297 |
| 5,025,826 A * | 6/1991 | Schoepe | .................. | F16K 31/60 137/315.15 |
| 6,035,463 A * | 3/2000 | Pawelzik | ............... | F16K 31/605 4/677 |
| 6,745,995 B2 * | 6/2004 | Hu | .......................... | F01P 7/167 123/41.08 |
| 7,178,786 B2 * | 2/2007 | Turnau, III | .............. | F16K 31/60 251/309 |
| 8,381,759 B1 * | 2/2013 | Chen | ........................ | F16K 31/60 D23/250 |
| 8,567,284 B2 * | 10/2013 | Huang | ................... | F16K 31/605 137/315.15 |
| 8,650,985 B2 * | 2/2014 | Huang | .................... | F16K 31/60 137/315.15 |

(Continued)

*Primary Examiner* — Matthew W Jellett
(74) *Attorney, Agent, or Firm* — Kyle A. Fletcher, Esq.

(57) ABSTRACT

The adjustable handle device for use with a valve stem is for use in rotating a valve stem of a valve. The adjustable handle device for use with a valve stem incorporates a handle structure and a capture structure. The capture structure attaches to the handle structure. The capture structure forms the working element of the tool formed by the adjustable handle device for use with a valve stem. The handle structure forms the handle of the tool formed by the adjustable handle device for use with a valve stem. The capture structure is a chuck that captures the valve stem. The handle structure rotates the capture structure to: a) tighten and loosen the capture structure to the valve stem; and, b) rotate the valve stem between a closed position and an open position.

10 Claims, 4 Drawing Sheets

(56) References Cited

U.S. PATENT DOCUMENTS

| | | | | |
|---|---|---|---|---|
| 8,833,385 B2* | 9/2014 | Huang | ................... | F16K 31/60 |
| | | | | 137/315.15 |
| 9,334,636 B1* | 5/2016 | Finegan, Jr. | .......... | E03C 1/0412 |
| 10,550,553 B1* | 2/2020 | Pankey | ................ | E03C 1/0412 |

* cited by examiner

ADJUSTABLE HANDLE DEVICE FOR USE WITH A VALVE STEM

CROSS REFERENCES TO RELATED APPLICATIONS

This non-provisional application claims priority under 35 USC 119(e) to United States provisional application U.S. 63/398,263 filed on Aug. 16, 2022, by the inventor: Donzino Pankey.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of valve members. (F16K1/36)

SUMMARY OF INVENTION

The adjustable handle device for use with a valve stem is a tool. The adjustable handle device for use with a valve stem is configured for use in rotating a valve stem of a valve. The adjustable handle device for use with a valve stem comprises a handle structure and a capture structure. The capture structure attaches to the handle structure. The capture structure forms the working element of the tool formed by the adjustable handle device for use with a valve stem. The handle structure forms the handle of the tool formed by the adjustable handle device for use with a valve stem. The capture structure is a chuck that captures the valve stem. The handle structure rotates the capture structure to: a) tighten and loosen the capture structure to the valve stem; and, b) rotate the valve stem between a closed position and an open position.

These together with additional objects, features and advantages of the adjustable handle device for use with a valve stem will be readily apparent to those of ordinary skill in the art upon reading the following detailed description of the presently preferred, but nonetheless illustrative, embodiments when taken in conjunction with the accompanying drawings.

In this respect, before explaining the current embodiments of the adjustable handle device for use with a valve stem in detail, it is to be understood that the adjustable handle device for use with a valve stem is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the adjustable handle device for use with a valve stem.

It is therefore important that the claims be regarded as including such equivalent construction insofar as they do not depart from the spirit and scope of the adjustable handle device for use with a valve stem. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
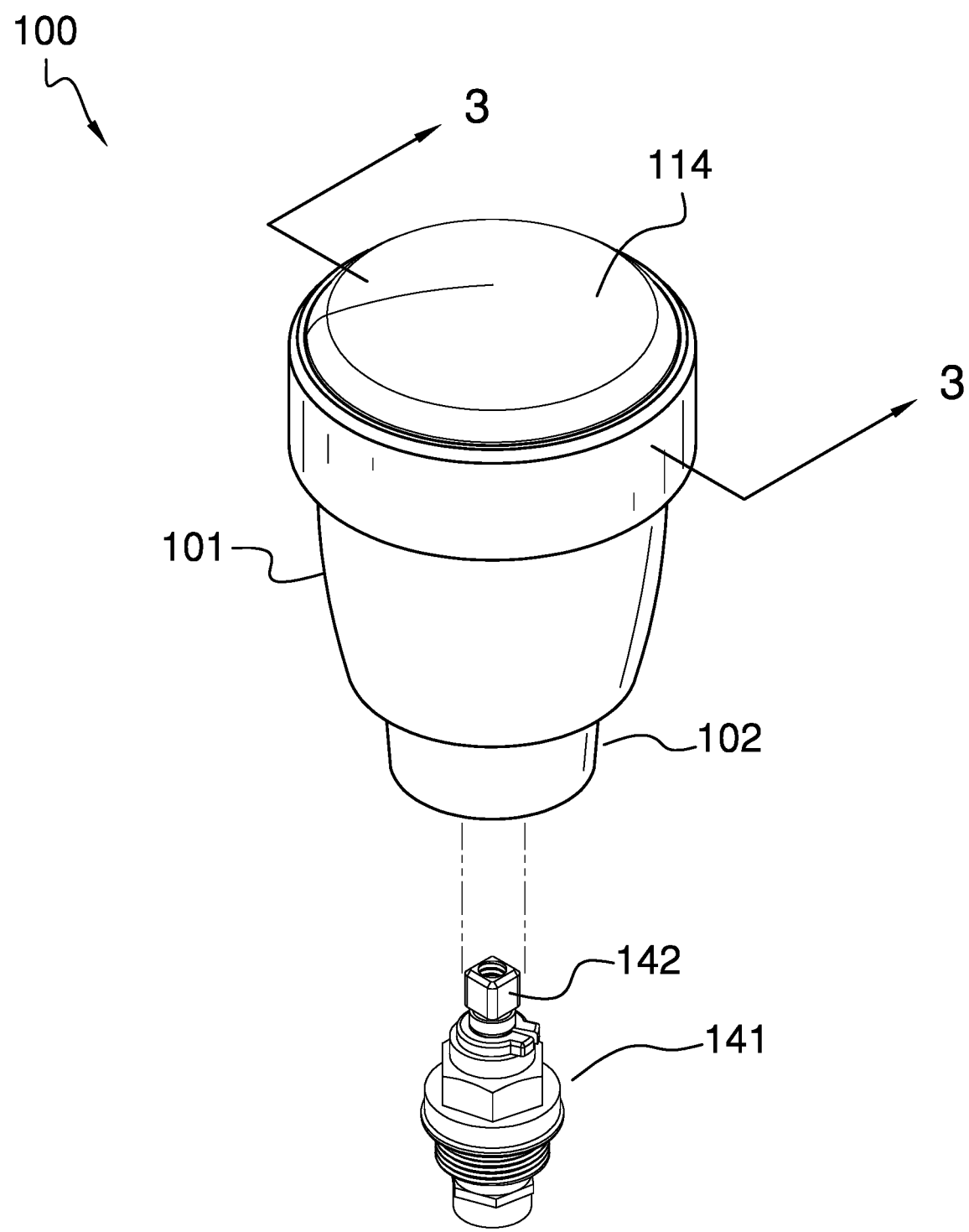
FIG. 1 is a perspective view of an embodiment of the disclosure.
Figure 2:
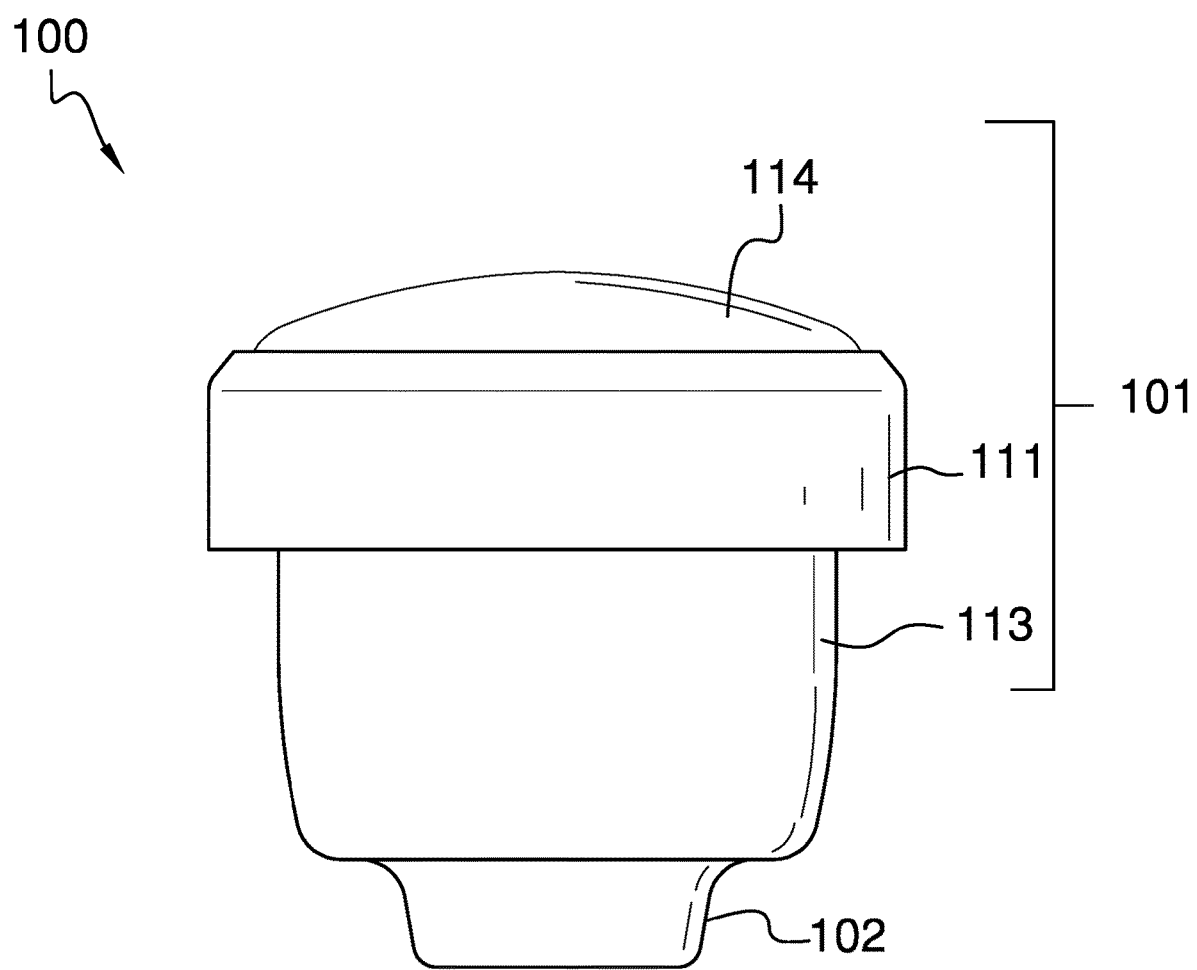
FIG. 2 is a front view of an embodiment of the disclosure.
Figure 3:
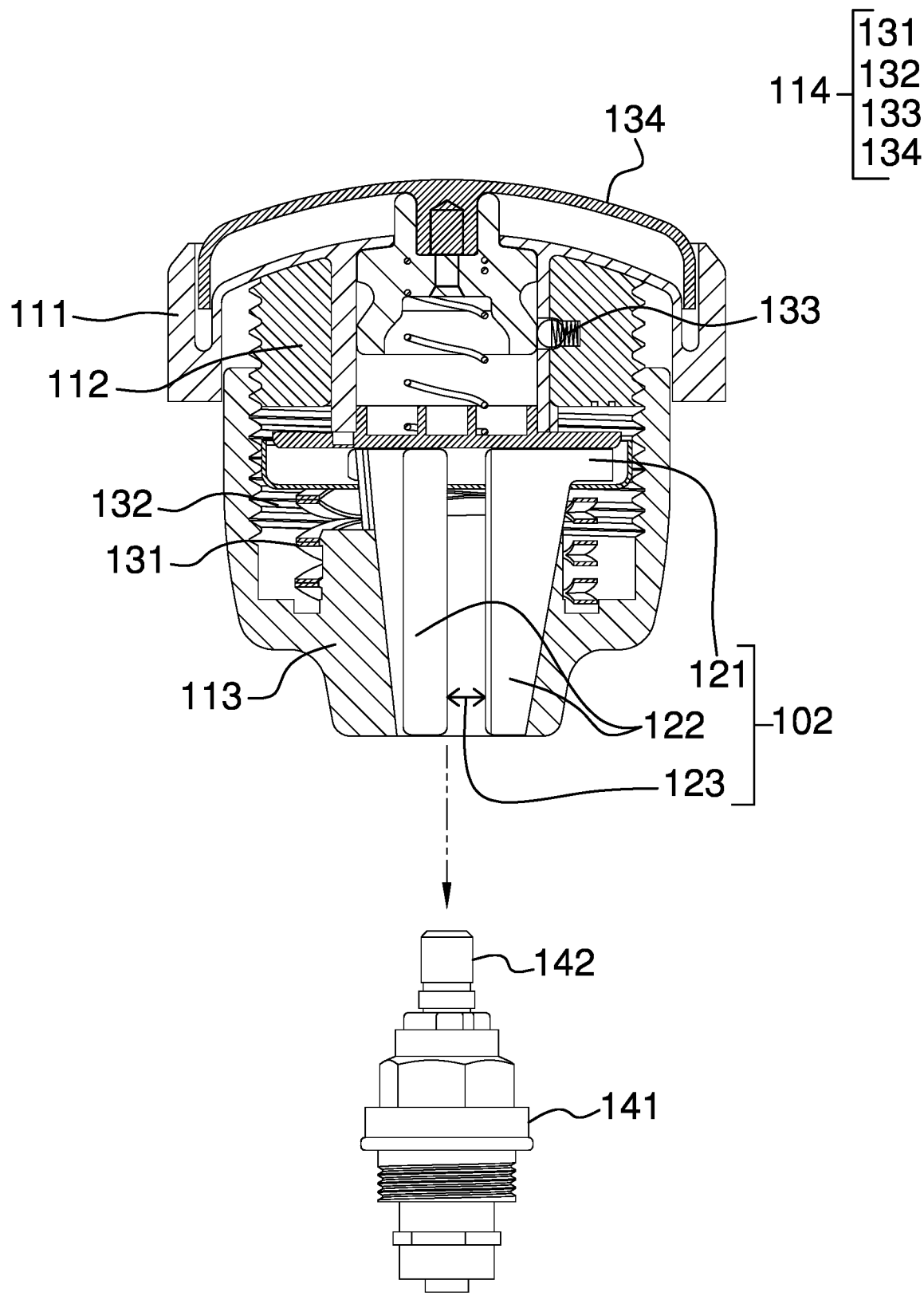
FIG. 3 is a cross-sectional view of an embodiment of the disclosure.
Figure 4:
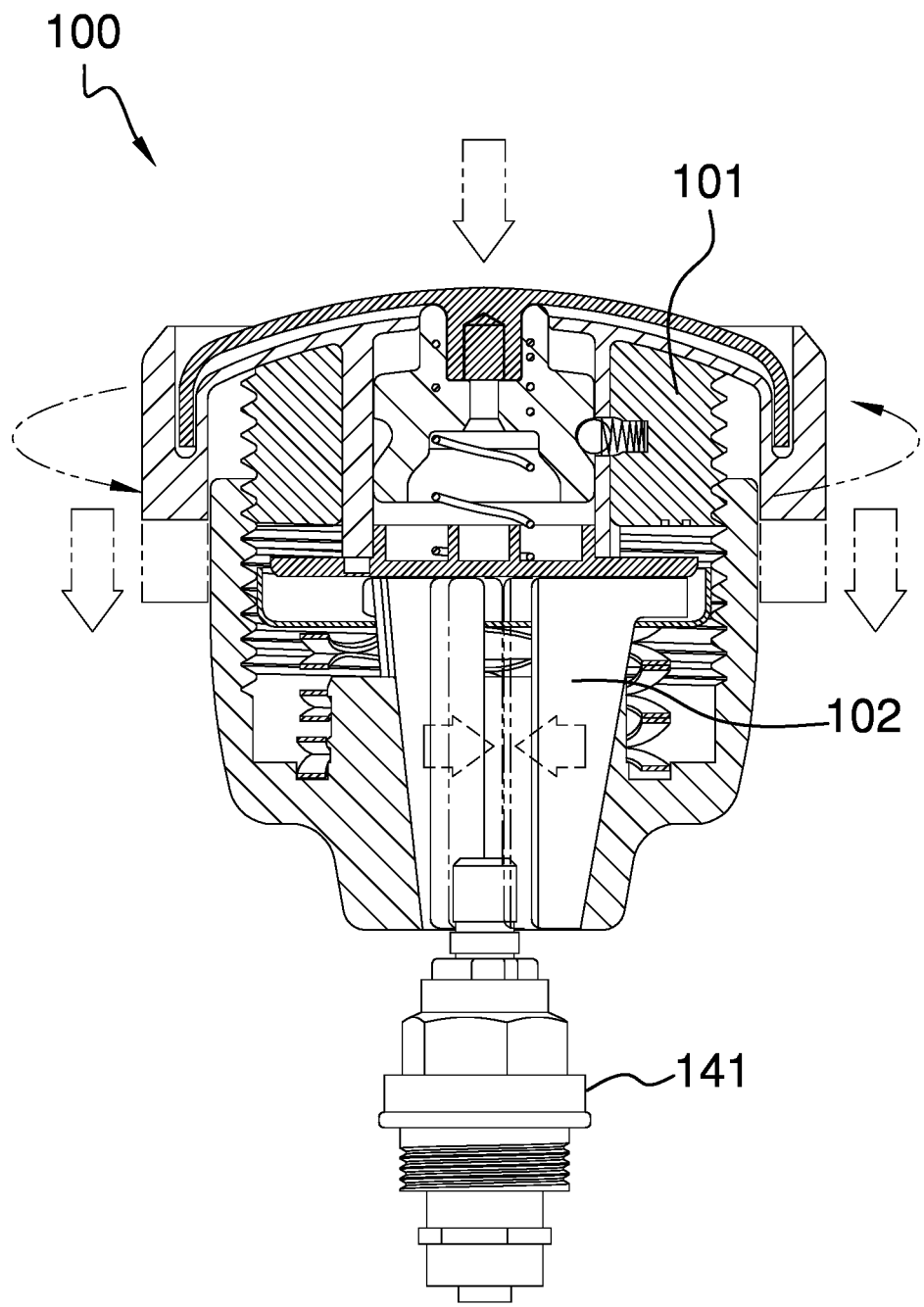
FIG. 4 is a cross-sectional view of an embodiment of the disclosure.

Detailed reference will now be made to one or more potential embodiments of the disclosure, which are illustrated in FIGS. 1 through 4.

The adjustable handle device for use with a valve stem 100 (hereinafter invention) is a tool. The invention 100 is configured for use in rotating a valve 141 stem 142 of a valve 141. The invention 100 comprises a handle structure 101 and a capture structure 102. The capture structure 102 attaches to the handle structure 101. The capture structure 102 forms the working element of the tool formed by the invention 100. The handle structure 101 forms the handle of the tool formed by the invention 100. The capture structure 102 is a chuck that captures the valve 141 stem 142. The handle structure 101 rotates the capture structure 102 to: a) tighten and loosen the capture structure 102 to the valve 141 stem 142; and, b) rotate the valve 141 stem 142 between a closed position and an open position.

The valve 141 is a mechanical device. The valve 141 is a fluid management device. The valve 141 forms a gate that controls the flow of fluid past a point. The valve 141 rotates between a closed position and an open position. In the closed position, the valve 141 prevents the flow of the fluid past the point. In the open position, the valve 141 allows the flow of the fluid past the point. The valve 141 stem 142 is a component of the valve 141. The valve 141 stem 142 is a rotating structure. The valve 141 stem 142 rotates the valve 141 between the closed position and the open position.

The handle structure 101 is a mechanical device. The handle structure 101 forms the handle of the tool formed by the invention 100. The handle structure 101 is a rotating structure. The rotation of the handle structure 101 is used to attach the capture structure 102 to the valve 141 stem 142. The rotation of the handle structure 101 is also used to detach the capture structure 102 from the valve 141 stem 142. The handle structure 101 is also used to generate a leverage used to rotate the valve 141 stem 142 between a closed position and an open position. In the first potential embodiment of the disclosure, the handle structure 101 is formed as a worm drive structure.

The handle structure 101 comprises a drive cylinder 111, a drive plate 112, a jaw sleeve 113, and a release structure 114.

The drive cylinder 111 is a rigid structure. The drive cylinder 111 is a prism shaped structure. The drive cylinder 111 has a cylindrical shape. The drive cylinder 111 is a tubular structure. The drive cylinder 111 is formed with an interior screw thread. The drive cylinder 111 is a rotating structure. The drive cylinder 111 is the structure of the handle structure 101 that is rotated to tighten the capture structure 102 to the valve 141 stem 142.

The drive plate 112 is a rigid structure. The drive plate 112 is a prism shaped structure. The drive plate 112 has a cylindrical shape. The drive plate 112 is formed with an exterior screw thread. The exterior screw thread is formed on the lateral face of the drive plate 112. The span of the length of the outer diameter of the drive plate 112 is lesser than the span of the length of the inner diameter of the drive cylinder 111 such that the drive plate 112 fits within the drive cylinder 111. The exterior screw thread of the drive plate 112 is sized such that the drive plate 112 screws into the interior screw thread of the drive cylinder 111.

The drive cylinder 111 forms the rotating structure of the worm drive structure of the handle structure 101 that moves the drive plate 112 in a linear direction that aligns with the center axis of the drive cylinder 111. A congruent end of the drive plate 112 attaches to the capture structure 102 such the linear motion of the drive plate 112 within the drive cylinder 111 moves the capture structure 102 within the jaw sleeve 113.

The jaw sleeve 113 is a negative space that is formed in the handle structure 101. The jaw sleeve 113 has a tapered prism shape. The jaw sleeve 113 is sized such that the capture structure 102 fits within the negative space formed by the jaw sleeve 113.

The release structure 114 is a mechanical device. The release structure 114 forms a mechanical linkage with the worm drive structure formed by the drive cylinder 111 and the drive plate 112. The release structure 114 is a quick release device. By quick release device is meant that the position of the drive plate 112 relative to the drive cylinder 111 can be changed without requiring the traditional rotations that screw the drive plate 112 within the drive cylinder 111. By quick release device is further meant that the release structure 114 generates the motive forces that return the drive plate 112 to a previously determined starting position within the drive cylinder 111. The release structure 114 further comprises a wave spring 131, a spring washer 132, a spring loaded lock ball detent 133, and a release plate 134.

The wave spring 131 is a spring. The wave spring 131 is a storage device for mechanical energy. The wave spring 131 deforms as the handle structure 101 tightens the capture structure 102 around the valve 141 stem 142. When the release structure 114 is initiated, the energy stored within the wave spring 131 is released such that: a) the mechanical linkage between the drive cylinder 111 and the drive plate 112 is released; and, b) the drive plate 112 is returned to the previously determined starting position. The spring washer 132 is defined elsewhere in this disclosure. The spring washer 132 improves the reliability of the worm drive structure of the handle structure 101.

The spring loaded lock ball detent 133 is a detent that holds the drive plate 112 in its working position relative to the drive cylinder 111. The spring loaded lock ball detent 133 forms a mechanical linkage with the release plate 134. The release plate 134 is a lever. The operation of the release structure 114 is initiated when the release plate 134 releases the spring loaded lock ball detent 133 from the drive cylinder 111. The release of the spring loaded lock ball detent 133 from the drive cylinder 111 allows the wave spring 131 to return towards its relaxed shape. The return of the wave spring 131 to its relaxed shape pushes the drive plate 112 to the previously determined position.

The capture structure 102 is a mechanical device. The capture structure 102 forms a chuck that removably attaches the handle structure 101 to the valve 141 stem 142. The handle structure 101 attaches the capture structure 102 to the valve 141 stem 142. The handle structure 101 tightens the capture structure 102 to the valve 141 stem 142. The release structure 114 of the handle structure 101 releases the capture structure 102 from the valve 141 stem 142. The capture structure 102 comprises a jaw cap 121, a plurality of jaw structures 122, and a jaw aperture 123.

The jaw cap 121 is a rigid structure. The jaw cap 121 is a disk shaped structure. The congruent end of the jaw cap 121 is geometrically similar to the congruent end of the jaw sleeve 113. The jaw cap 121 permanently attaches to the congruent end of the jaw sleeve 113 such that the center axes of the jaw cap 121 and the jaw sleeve 113 align.

The plurality of jaw structures 122 form the capturing element of the capture structure 102. The plurality of jaw structures 122 comprise a plurality of rigid shafts. The plurality of jaw structures 122 attach to the congruent end of the jaw cap 121 that is distal to the drive plate 112. The plurality of jaw structures 122 attach to the congruent end of the jaw cap 121 such that each jaw structure can move relative to the jaw cap 121. The plurality of jaw structures 122 extend from the jaw cap 121 such that the plurality of jaw structures 122 are contained within the jaw sleeve 113. The movement of the drive plate 112 relative to the drive cylinder 111 moves the plurality of jaw structures 122 within the jaw sleeve 113. The tapered structure of the jaw sleeve 113 guides the position of each jaw structure selected from the plurality of jaw structures 122 relative to the other jaw structures in the plurality of jaw structures 122.

The jaw aperture 123 is a measure of the span of the length of the diameter of the empty space that is maintained between the plurality of jaw structures 122 as the plurality of jaw structures 122 moves within the jaw sleeve 113. The size of the jaw aperture 123 is controlled by controlling the position of the drive plate 112 relative to the drive cylinder 111. The plurality of jaw structures 122 are secured to the valve 141 stem 142 by inserting the valve 141 stem 142 into the space defined by the jaw aperture 123 and then moving the plurality of jaw structures 122 relative to the jaw sleeve 113 such that the plurality of jaw structures 122 applies a pressure against the valve 141 stem 142.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Barrier: As used in this disclosure, a barrier is a physical obstacle that forms a boundary between a first space and a second space. The barrier prevents the passage of an object between the first space and the second space.

Bolt: As used in this disclosure, a bolt is a cylindrical shaft that is formed with an exterior screw thread. A bolt is defined with an outer dimension.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Chuck: As used in this disclosure, a chuck is a structure that attaches a bit or a working element to a tool. The part of the chuck that opens and closes to capture the bit is called the jaw. The use of a chuck is well-known and documented in the mechanical arts.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Detent: As used in this disclosure, a detent is a device for positioning and holding a first object relative to a second object such that the position of the first object relative to the second object is adjustable.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Elastic Nature: As used in this disclosure, an elastic nature refers to a flexible structure that returns to its relaxed shape after the flexible structure has been deformed.

Exterior: As used in this disclosure, the exterior is used as a relational term that implies that an object is not contained within the boundary of a structure or a space.

Faucet: As used in this disclosure, a faucet refers to a valve and a discharge pipe that draws water from a pipe or reservoir and discharges the drawn water through the discharge pipe. When the term faucet is applied to a sink, the term faucet refers to a single discharge pipe and all the valves that feed the discharge pipe.

Flexible: As used in this disclosure, flexible refers to an object or material that will deform when a force is applied to it but that will not necessarily return to its original shape when the deforming force is removed.

Foraminous: As used in this disclosure, foraminous is an adjective that describes a surface, plate, disk, or platform that is perforated with a plurality of apertures.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Hand Tool: As used in this disclosure, a hand tool refers to a tool that is small and light enough to allow a person to hold the tool during use.

Helical Spring: As used in this disclosure, a helical spring is a compression spring shaped in the form of a cylindrical helix.

Housing: As used in this disclosure, a housing is a rigid structure that encloses and protects one or more devices.

Inelastic Nature: As used in this disclosure, an inelastic nature refers to a flexible structure that maintains its new shape after the flexible structure has been deformed.

Interior: As used in this disclosure, the interior is used as a relational term that implies that an object is contained within the boundary of a structure or a space.

Loop: As used in this disclosure, a loop is the length of a first linear structure including, but not limited to, shafts, lines, cords, or webbings, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Modulus: As used in this disclosure, the modulus of an elastomeric structure is a function that describes the resistance to the deformation of an elastomeric structure as a function of the force applied to the elastomeric structure. When comparing modulus, a larger modulus is taken to imply a greater force is required to achieve the same deformation.

Negative Space: As used in this disclosure, negative space is a method of defining an object through the use of open or empty space as the definition of the object itself, or, through the use of open or empty space to describe the boundaries of an object.

Nut: As used in this disclosure, a nut is a first object that is formed with a cylindrical negative space that further comprises an interior screw thread such that a second object with a matching exterior screw thread can screwed into the first object forming a threaded connection. A nut is further defined with an inner dimension.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Protected Space: As used in this disclosure, a protected space is a negative space within which an object is stored. The protected space is enclosed by a barrier structure that: a) prevents damage to the object contained within the protected space; b) maintains conditions that are appropriate for the object; c) protects the object within the protected space from potential dangers that are outside of the protected space; or, d) maintains the privacy of the object within the protected space.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Relaxed Shape: As used in this disclosure, a structure is considered to be in its relaxed state when no shear, strain, or torsional forces are being applied to the structure.

Rigid Structure: As used in this disclosure, a rigid structure is a solid structure formed from an inelastic material that resists changes in shape. A rigid structure will permanently deform as it fails under a force. See bimodal flexible structure.

Ring: As used in this disclosure, a ring is a term that is used to describe a disk-like structure through which a negative space is formed through the faces of the disk-like structure. Rings are often considered loops. The negative space formed through the faces of the disk-like structure is called the characteristic aperture. See Iris Structure Rotation: As used in this disclosure, rotation refers to the cyclic movement of an object around a fixed point or fixed axis. The verb of rotation is to rotate.

Sacrificial Material: As used in this disclosure, a sacrificial material is a material that protects a first object or structure from damage. More specifically, the sacrificial material protects the second object or structure by being damaged during use of the second object or structure.

Sacrificial Structure: As used in this disclosure, a sacrificial structure is a first object or structure that protects a second object or structure from damage. More specifically, the sacrificial structure protects the second object or structure by being damaged instead of the second object or structure.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Sleeve: As used in this disclosure, a sleeve is a tube like covering that is placed over a rod, shaft or other prism-shaped object.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Spring Washer: As used in this disclosure, a spring washer is a small helical spring that is used to lock a threaded connection into position. The spring washer is also called a locking nut and a locking washer.

Spring Loaded Lock Ball: As used in this disclosure, a spring loaded lock is a detent formed from a spring loaded spherical structure located in a first object which retracts and then snaps into an opposing hole or groove formed in a second object to hold the second object in position. They are also commonly referred to as ball detents, spring loaded plungers, spring plungers, and ball locks.

Stem: As used in this disclosure, a stem refers to a prism shaped structure that rotates. The stem is rotated to open and close a valve.

Taper: As used in this disclosure, a taper is a continuous and typically, but not necessarily gradual, change in the span of the length of a structure in the direction parallel a direction selected from the group selected from the major axis and the minor axis of the structure. The change in the span of the length occurs as an apparent function of the measurement position along the unselected axis of the object. Always use major and minor axes.

Tapered Prism Structure: As used in this disclosure, a tapered prism structure is a modified prism structure that is formed such that the first congruent end of the modified prism structure is geometrically similar to, but not geometrically identical to the second congruent end of the modified prism. The span of length of a radial line from the center axis to the lateral face of the modified prism structure will vary as a function of its position along the center axis. Always use taper.

Threaded Connection: As used in this disclosure, a threaded connection is a type of fastener that is used to join a first cylindrical object and a second cylindrical object together. The first cylindrical object is fitted with a first fitting selected from an interior screw thread or an exterior screw thread. The second cylindrical object is fitted with the remaining screw thread. The cylindrical object fitted with the exterior screw thread is placed into the remaining cylindrical object such that: 1) the interior screw thread and the exterior screw thread interconnect; and, 2) when the cylindrical object fitted with the exterior screw thread is rotated the rotational motion is converted into linear motion that moves the cylindrical object fitted with the exterior screw thread either into or out of the remaining cylindrical object. The direction of linear motion is determined by the direction of rotation.

Tool: As used in this disclosure, a tool is a device, an apparatus, or an instrument that is used to carry out an activity, operation, or procedure. A tool generally comprises a working element and a handle. The handle of a tool that forms a sub-component of a larger structure is referred to as a mount.

Tube: As used in this disclosure, the term tube is used to describe a hollow prism-shaped device with two congruent open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

Valve: As used in this disclosure, a valve is a device that is used to control the flow of a fluid (gas or liquid) through a pipe, tube, or hose.

Wedge Spring: As used in this disclosure, a wedge spring is a prism shaped tubular spring structure. The lateral face of the prism structure is a foraminous structure. The wedge spring is deformed by an application of force in the direction parallel to a center axis of the prism shaped structure of the wedge spring.

Working Element: As used in this disclosure, the working element of a tool is the physical element on the tool that performs the actual activity, operation, or procedure the tool is designed to perform. For example, the cutting edge of a blade is the working element of a knife.

Worm Drive: As used in this disclosure, a worm drive refers to a mechanical arrangement where a rotating structure further comprising an exterior screw thread is used to: 1) rotate a gear; or 2) move a structure formed with a screw thread in a linear fashion in the direction of the center axis of the rotating cylinder. Worm drives are also referred to as worm With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An adjustable handle device for use with a valve stem comprising
   a handle structure and a capture structure;
   wherein the capture structure attaches to the handle structure;
   wherein the capture structure is configured for use with a valve stem of a valve;
   wherein the handle structure rotates the capture structure to: a) tighten and loosen the capture structure to the valve stem; and, b) rotate the valve stem between a closed position and an open position;
   wherein the handle structure comprises a drive cylinder, a drive plate, the jaw sleeve, and a release structure;
   wherein the release structure forms a mechanical linkage with the jaw sleeve and the drive plate;
   wherein the release structure is a quick release device;
   wherein a position of the drive plate relative to the drive cylinder is able to be changed without requiring rotations that screw the drive plate within the drive cylinder;
   wherein the release structure returns the drive plate to a Previously determined starting position within the drive cylinder.

2. The adjustable handle device for use with a valve stem according to claim 1
   wherein the capture structure forms a working element of the tool formed by the adjustable handle device;
   wherein the handle structure forms a handle of a tool formed by the adjustable handle device for use with a valve stem.

3. The adjustable handle device for use with a valve stem according to claim 2
   wherein the valve is a mechanical device;
   wherein the valve is a fluid management device;
   wherein the valve controls the flow of fluid past a point;
   wherein in the closed position, the valve prevents the flow of the fluid past the point;
   wherein in the open position, the valve allows the flow of the fluid past the point;
   wherein the valve stem is a component of the valve;
   wherein the valve stem is a rotating structure;

wherein the valve stem rotates the valve between the closed position and the open position.

4. The adjustable handle device for use with a valve stem according to claim 3
wherein the handle structure is a mechanical device;
wherein the handle structure is a rotating structure;
wherein the rotation of the handle structure attaches the capture structure to the valve stem;
wherein the rotation of the handle structure detaches the capture structure from the valve stem;
wherein the handle structure generates a leverage used to rotate the valve stem between the closed position and the open position.

5. The adjustable handle device for use with a valve stem according to claim 4
wherein the drive cylinder is a rigid structure;
wherein the drive cylinder has a cylindrical shape;
wherein the drive cylinder is a tubular structure;
wherein the drive cylinder is a rotating structure;
wherein the drive cylinder is the structure of the handle structure that is rotated to tighten the capture structure to the valve stem.

6. The adjustable handle device for use with a valve stem according to claim 5
wherein the handle structure comprises the drive plate;
wherein the drive plate is a rigid structure;
wherein the drive plate has a cylindrical shape;
wherein the drive plate is formed with an exterior screw thread;
wherein the exterior screw thread is formed on the lateral face of the drive plate;
wherein a span of a length of an outer diameter of the drive plate is lesser than a span of a length of an inner diameter of the drive cylinder such that the drive plate fits within the drive cylinder;
wherein the drive cylinder forms the rotating structure of the handle structure that moves the drive plate in a linear direction that aligns with the center axis of the drive cylinder;
wherein a congruent end of the drive plate attaches to the capture structure such the linear motion of the drive plate within the drive cylinder moves the capture structure.

7. The adjustable handle device for use with a valve stem according to claim 6
wherein the handle structure comprises a jaw sleeve;
wherein the jaw sleeve is a negative space that is formed in the handle structure;
wherein the jaw sleeve has a tapered shape;
wherein the jaw sleeve is sized such that the capture structure fits within the negative space formed by the jaw sleeve;
wherein the jaw sleeve is formed with an interior screw thread;
wherein the exterior screw thread of the drive plate is sized such that the drive plate screws into the interior screw thread of the jaw plate.

8. The adjustable handle device for use with a valve stem according to claim 7
wherein the release structure further comprises a wave spring, a spring washer, a spring loaded lock ball detent, and a release plate;
wherein the wave spring is a spring;
wherein the wave spring is a storage device for mechanical energy;
wherein the wave spring deforms as the handle structure tightens the capture structure around the valve stem;
wherein when the release structure is initiated, energy stored within the wave spring is released such that: a) the mechanical linkage between the drive cylinder and the drive plate is released; and, b) the drive plate is returned to the previously determined starting position;
wherein the spring washer improves a reliability of the handle structure;
wherein the spring loaded lock ball detent is a detent that holds the drive plate in its working position relative to the drive cylinder;
wherein the spring loaded lock ball detent forms the mechanical linkage with the release plate;
wherein the release plate is a lever;
wherein the operation of the release structure is initiated when the release plate releases the spring loaded lock ball detent from the drive cylinder;
wherein the release of the spring loaded lock ball detent from the drive cylinder allows the wave spring to return towards its relaxed shape;
wherein the return of the wave spring to its relaxed shape pushes the drive plate to the previously determined position.

9. The adjustable handle device for use with a valve stem according to claim 8
wherein the capture structure is a mechanical device;
wherein the capture structure forms a chuck that removably attaches the handle structure to the valve stem;
wherein the handle structure attaches the capture structure to the valve stem;
wherein the handle structure tightens the capture structure to the valve stem;
wherein the release structure of the handle structure releases the capture structure from the valve stem.

10. The adjustable handle device for use with a valve stem according to claim 9
wherein the capture structure comprises a jaw cap, a plurality of jaw structures, and a jaw aperture;
wherein the jaw cap is a rigid structure;
wherein the jaw cap is a disk shaped structure;
wherein a congruent end of the jaw cap is geometrically similar to a congruent end of the jaw sleeve;
wherein the jaw cap permanently attaches to the congruent end of the jaw sleeve such that center axes of the jaw cap and the jaw sleeve align;
wherein the plurality of jaw structures form a capturing element of the capture structure;
wherein the plurality of jaw structures comprise a plurality of rigid shafts;
wherein the plurality of jaw structures attach to the congruent end of the jaw cap that is distal to the drive plate;
wherein the plurality of jaw structures attach to the congruent end of the jaw cap such that each jaw structure can move relative to the jaw cap;
wherein the plurality of jaw structures extend from the jaw cap such that the plurality of jaw structures are contained within the jaw sleeve;
wherein the movement of the drive plate relative to the drive cylinder moves the plurality of jaw structures within the jaw sleeve;
wherein the jaw aperture is a measure of a span of a length of a diameter of an empty space that is maintained between the plurality of jaw structures as the plurality of jaw structures moves within the jaw sleeve;

wherein a size of the jaw aperture is controlled by controlling the position of the drive plate relative to the drive cylinder.

\* \* \* \* \*